(12) United States Patent
Choi

(10) Patent No.: US 12,111,776 B2
(45) Date of Patent: Oct. 8, 2024

(54) MULTI-DIMENSIONAL MEMORY CLUSTER

(71) Applicant: Samsung Electronics Co., Ltd., Suwon-si (KR)

(72) Inventor: Byung Hee Choi, Fremont, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 342 days.

(21) Appl. No.: 17/553,393

(22) Filed: Dec. 16, 2021

(65) Prior Publication Data

US 2023/0139732 A1     May 4, 2023

Related U.S. Application Data

(60) Provisional application No. 63/274,381, filed on Nov. 1, 2021.

(51) Int. Cl.
    *G06F 13/16*     (2006.01)
    *G06F 11/07*     (2006.01)

(52) U.S. Cl.
CPC ...... *G06F 13/1668* (2013.01); *G06F 11/0727* (2013.01); *G06F 11/0751* (2013.01); *G06F 11/0793* (2013.01)

(58) Field of Classification Search
CPC ............. G06F 13/1668; G06F 11/0727; G06F 11/0751; G06F 11/0793; G06F 3/0617; G06F 3/0631; G06F 3/0635; G06F 3/067; G06F 2212/1024; G06F 2212/1048; G06F 12/0284; G06F 2212/154; G06F 12/0802; G06F 12/0207; G06F 13/1694; G06F 13/4221; G06F 2213/0026; H04L 45/22; H04L 45/28; H04L 45/302

See application file for complete search history.

(56) References Cited

U.S. PATENT DOCUMENTS

| | | | |
|---|---|---|---|
| 5,471,580 A | 11/1995 | Fujiwara et al. | |
| 6,115,716 A | 9/2000 | Tikkanen et al. | |
| 6,230,252 B1 | 5/2001 | Passint et al. | |
| 6,499,032 B1 | 12/2002 | Tikkanen et al. | |
| 7,400,590 B1 * | 7/2008 | Rygh ...................... | H04L 45/00 370/254 |

(Continued)

FOREIGN PATENT DOCUMENTS

WO     WO-2019179282 A1 *   9/2019

OTHER PUBLICATIONS

US RE48,630 E, 07/2021, Ludwig et al. (withdrawn)

(Continued)

*Primary Examiner* — Masud K Khan
(74) *Attorney, Agent, or Firm* — Lewis Roca Rothgerber Christie LLP

(57) ABSTRACT

A multi-dimensional memory cluster. In some embodiments, the memory cluster includes a first node, having an external port for making a connection to a host; a second node, connected to the first node by a first memory-centric connection; the second node storing a service level descriptor; the first node being configured to: receive, from the host, a first request, addressed to the second node, for the service level descriptor; and forward the first request to the second node, the second node being configured to: receive the first request; and send a first response, to the first node, the first response including the service level descriptor of the second node.

20 Claims, 14 Drawing Sheets

(56) References Cited

U.S. PATENT DOCUMENTS

| | | |
|---|---|---|
| 7,515,552 B2 | 4/2009 | Bhatti |
| 7,581,079 B2 | 8/2009 | Pechanek |
| 7,957,385 B2 | 6/2011 | Henry et al. |
| 7,957,400 B2 | 6/2011 | Henry et al. |
| 8,407,424 B2 | 3/2013 | Dai et al. |
| 9,806,908 B2 | 10/2017 | James |
| 10,057,334 B2 | 8/2018 | Choi |
| 10,277,677 B2 | 4/2019 | Nachimuthu et al. |
| 10,832,371 B2 | 11/2020 | Doyle et al. |
| 10,895,992 B2 | 1/2021 | Frank et al. |
| 2010/0250784 A1 | 9/2010 | Henry et al. |
| 2014/0185611 A1 | 7/2014 | Lie et al. |
| 2015/0341273 A1 | 11/2015 | Naouri et al. |
| 2019/0034763 A1 | 1/2019 | Guim Bernat et al. |
| 2019/0102093 A1 | 4/2019 | Parnell et al. |
| 2020/0236052 A1 | 7/2020 | Srinivasan et al. |
| 2020/0280518 A1 | 9/2020 | Lee et al. |
| 2020/0371692 A1 | 11/2020 | Van Doorn et al. |
| 2021/0133583 A1 | 5/2021 | Chetlur et al. |
| 2021/0173777 A1 | 6/2021 | Zhang et al. |
| 2022/0229560 A1* | 7/2022 | Dar ................. G06F 3/0613 |

OTHER PUBLICATIONS

EPO Extended European Search Report dated Dec. 12, 2022, issued in corresponding European Patent Application No. 22183261.1 (14 pages).

* cited by examiner

| Dimensions | # of Nodes | # of quad full mesh Networks | Max # hops | # of bits for Node Address | # of links or Ports/Node |
|---|---|---|---|---|---|
| 0 | 1 | 0 | 0 | 0 | 0 |
| 1 | 4 | 1 | 1 | 2 | 3 |
| 2 | 16 | 4 | 2 | 4 | 6 |
| 3 | 64 | 16 | 3 | 6 | 9 |
| 4 | 256 | 64 | 4 | 8 | 12 |
| 5 | 1024 | 256 | 5 | 10 | 15 |
| 6 | 4096 | 1024 | 6 | 12 | 18 |
| 7 | 16384 | 4096 | 7 | 14 | 21 |
| 8 | 65536 | 16384 | 8 | 16 | 24 |
| 9 | 262144 | 65536 | 9 | 18 | 27 |
| 10 | 1048576 | 262144 | 10 | 20 | 30 |
| ... | ... | ... | ... | ... | ... |
| N | $4^N$ | $4^{(N-1)}$ | N | $2*N$ | $3*N$ |

FIG. 3

Example: The addressing scheme for 64 nodes in a single memory POD

| Dimensions | Location | Node Address | Routing Ports |
|---|---|---|---|
| 0 | Single Board | (x,y,z) = (X,X,0) | (x,y,z) = (X,X,0) |
| 1 | Single SLED | (x,y,z) = (X,X,1:0) | (x,y,z) = (X,X,2:0) |
| 2 | Multiple SLED | (x,y,z) = (X,1:0,X) | (x,y,z) = (X,5:3,X) |
| 3 | Multiple SLED/A POD | (x,y,z) = (1:0,X,X) | (x,y,z) = (8:6,X,X) |

FIG. 6

MULTI-DIMENSIONAL MEMORY CLUSTER

CROSS-REFERENCE TO RELATED APPLICATION(S)

The present application claims priority to and the benefit of U.S. Provisional Application No. 63/274,381, filed Nov. 1, 2021, entitled "ADAPTIVE TOPOLOGY DISCOVERY PROTOCOL FOR DISAGGREGATED MEMORY ARCHITECTURE WITH NOVEL INTERCONNECTS", the entire content of which is incorporated herein by reference.

FIELD

One or more aspects of embodiments according to the present disclosure relate to memory, and more particularly to a multi-dimensional memory cluster.

BACKGROUND

As applications for computing systems become more capable and require greater computing resources, larger memories may be used. Double data rate (DDR) memory, having a parallel interface, may not be readily composable; as such, constructing large memory pools using DDR memory may be challenging.

Thus, there is a need for an improved architecture for a large memory pool.

SUMMARY

In some embodiments, a memory cluster is constructed as an N-dimensional system with a number of nodes equal to $k^N$, where k is the number of nodes in a basic building block cluster. Each node may include a certain quantity of memory. The nodes may be connected in a full-mesh connection along each dimension, so that at most N hops are needed to reach any node from any other node. Each node may have one or more service level characteristics, e.g., it may be a relatively fast node (measured, e.g., by latency and throughput) or a relatively slow node. A host connected to the memory cluster may allocate memory from the cluster to applications running on the host based on the service level needs of each application.

According to an embodiment of the present disclosure, there is provided a system, including: a first node, having an external port for making a connection to a host; a second node, connected to the first node by a first memory-centric connection; the second node storing a service level descriptor; the first node being configured to: receive, from the host, a first request, addressed to the second node, for the service level descriptor; and forward the first request to the second node, the second node being configured to: receive the first request; and send a first response, to the first node, the first response including the service level descriptor of the second node.

In some embodiments, the first memory-centric connection is a Compute Express Link (CXL) connection.

In some embodiments, the second node further stores a topology identifier including an address of the second node along a first dimension, and an address of the second node along a second dimension.

In some embodiments: the topology identifier further includes: a port identifier for a first port of the second node, and a port identifier for a second port of the second node, the first port of the second node is connected, by a second memory-centric connection, to a third node, the third node being separated from the second node along the first dimension; and the second port of the second node is connected, by a third memory-centric connection, to a fourth node, the fourth node being separated from the second node along the second dimension.

In some embodiments, the third memory-centric connection has a bandwidth at least twice as great as a bandwidth of the second memory-centric connection.

In some embodiments, the second node is configured, upon receipt of a disconnect command identifying the first port of the second node, to disconnect the second node from the third node.

In some embodiments, the system further includes a host, connected to the first node, wherein the host is configured: to detect a fault affecting the third node, and in response to detecting the fault, to send the disconnect command.

In some embodiments: the first node is further configured to receive, from the host, a second request, addressed to the second node, for the topology identifier; and forward the second request to the second node, the second node is further configured to: receive the second request; and send a second response, to the first node, the second response including the topology identifier of the second node.

In some embodiments, the first node is connected, along the first dimension, to M other nodes, M being an integer greater than or equal to 4.

In some embodiments, the first node is connected, along the first dimension, to M other nodes, M being equal to 1 or 2.

According to an embodiment of the present disclosure, there is provided a method, including: receiving, by a first node having an external port for making a connection to a host, a first request, addressed to a second node connected to the first node by a first memory-centric connection, the first request being a request for a service level descriptor stored by the second node; forwarding, by the first node, the first request to the second node; receiving, by the second node, the first request; and sending a first response, by the second node, to the first node, the first response including the service level descriptor of the second node.

In some embodiments, the first memory-centric connection is a Compute Express Link (CXL) connection.

In some embodiments, the second node further stores a topology identifier including an address of the second node along a first dimension, and an address of the second node along a second dimension.

In some embodiments: the topology identifier further includes: a port identifier for a first port of the second node, and a port identifier for a second port of the second node, the first port of the second node is connected, by a second memory-centric connection, to a third node, the third node being separated from the second node along the first dimension; and the second port of the second node is connected, by a third memory-centric connection, to a fourth node, the fourth node being separated from the second node along the second dimension.

In some embodiments, the third memory-centric connection has a bandwidth at least twice as great as a bandwidth of the second memory-centric connection.

In some embodiments, the method further includes: receiving, by the second node, a disconnect command identifying the first port of the second node; and disconnecting the second node from the third node.

In some embodiments, the method further includes: detecting, by a host connected to the first node, a fault affecting the third node; and in response to detecting the fault, sending, by the host, the disconnect command.

In some embodiments, the method further includes: receiving, by the first node, from the host, a second request, addressed to the second node, for the topology identifier; and forwarding, by the first node, the second request to the second node; receiving, by the second node, the second request; and sending, by the second node, a second response, to the first node, the second response including the topology identifier of the second node.

In some embodiments, the first node is connected, along the first dimension, to M other nodes, M being an integer greater than or equal to 4.

According to an embodiment of the present disclosure, there is provided a system, including: a first node, including a first means for processing, and having an external port for making a connection to a host; a second node, connected to the first node by a first memory-centric connection, the second node including a second means for processing; the second node storing a service level descriptor; the first means for processing being configured to: receive, from the host, a first request, addressed to the second node, for the service level descriptor; and forward the first request to the second node, the second means for processing being configured to: receive the first request; and send a first response, to the first node, the first response including the service level descriptor of the second node.

BRIEF DESCRIPTION OF THE DRAWINGS

These and other features and advantages of the present disclosure will be appreciated and understood with reference to the specification, claims, and appended drawings wherein:

FIG. 3 is a table of cluster characteristics, according to an embodiment of the present disclosure;

FIG. 6 is a table of possible node locations for up to three dimensions, according to an embodiment of the present disclosure;

DETAILED DESCRIPTION

Figure 1:
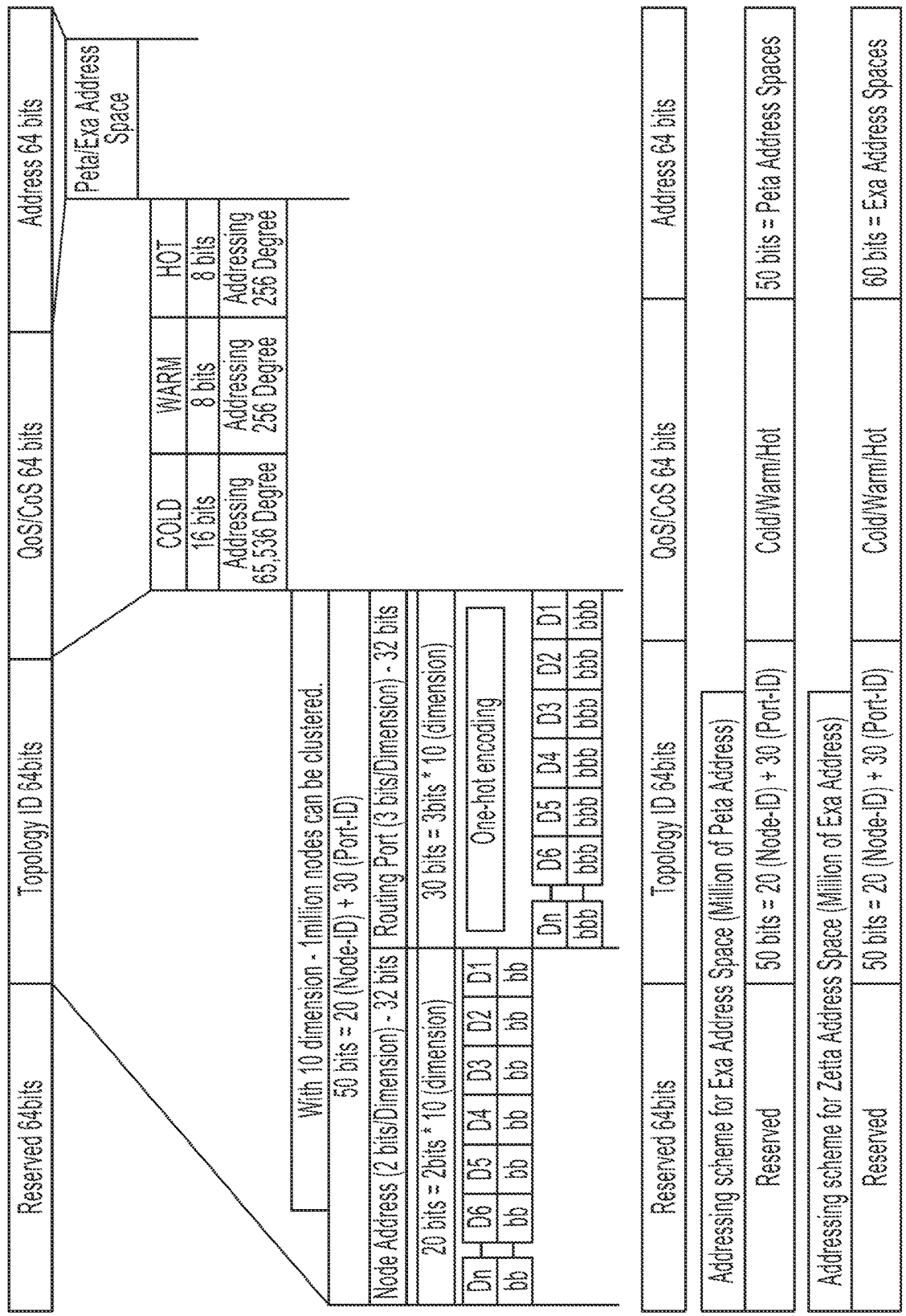
FIG. 1 is an address word diagram, according to an embodiment of the present disclosure.

The detailed description set forth below in connection with the appended drawings is intended as a description of exemplary embodiments of a multi-dimensional memory cluster provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In some embodiments, the systems disclosed herein contribute a novel and effective addressing scheme for a dimension-oriented (or "layer-oriented") scale-up or scale-out clustering architecture. The systems disclosed herein provide methods for abstraction on resource pools with a large number of memory or storage nodes in an exceptionally efficient manner. These methods may result in faster node discovery through the application of QoS/CoS and fault isolation capabilities. Thus, latency control may be possible and may allow for efficient hardware design (e.g., receive (Rx) buffer and retry buffer size decisions). Some embodiments may make the complexity as low as possible, despite growing capacity with higher layers or dimensions (e.g., with the cluster size scaling up or out). Some embodiments involve recursively applying the same addressing rule (e.g., hyper-torus full mesh) as the cluster scale grows in layers or dimensions. Such an approach may achieve the most effective node discovery protocol for large disaggregated memory or storage resource pools.

Topological information provided by some embodiments can enable deterministic latency control capabilities per layer or dimension of the full mesh cluster; this allows for the memory or storage pool access design to be synchronous per segment or region, if required.

Topological information from some embodiments allows for QoS/CoS engineering (e.g., hot, warm, and cold tiers) on memory or storage regions per layer or dimension. Such topological information may make disaster control possible; effective fault isolation may be available for the layer-oriented or dimension-oriented clustering architecture.

In some embodiments, an addressing scheme combines several characteristic components that include: the node network topology, quality of service or class of service (QoS/CoS) features, and a memory address for memory operations. Such an addressing scheme may provide an effective and simplified method for managing large scaled up or scaled out memory node pools. As used herein, a "node" or "memory node" is a circuit that includes memory (e.g., dynamic random-access memory (DRAM), or flash memory) and that has one or more ports (e.g., electrical ports or optical ports) for making connections to other nodes or to one or more hosts.

Some embodiments may use a four-node (or "quad-node") full mesh and dimension driven hyper-torus architecture. The dimension information of the nodes and the port information of the links on the nodes may be part of the addressing scheme (discussed in further detail below). In some embodiments, (i) dimension information, (ii) node IDs in the given dimension, and (iii) link IDs for, e.g., quad-node full mesh connections are components of the addressing scheme for the clustering architecture. Along with these components, QoS/CoS features are added to provide more useful information, so that rich services may be available for data centers (DCs).

For the node addressing scheme, the dimension and node ID information may be considered together. In the quad-node full mesh cluster, which is the basic building block for some embodiments, two bits can produce four unique IDs that can identify each node in the quad-node full mesh. This basic building block rule is applied recursively for each additional dimension as the cluster grows (see FIGS. 2A-2D, discussed in further detail below). The address space for each dimension utilizes a 2-bit field, so each growing dimension requires an additional 2-bit field, concatenated with the previous dimensions. The dimension information is embedded in the 2-bit field of the node address space (see FIG. 1, discussed in further detail below). The first 2-bit field from the least significant bit (LSB) side represents the lowest dimension (see dimension 1, D1, in the node address space of FIG. 1), and, in the direction of the most significant bit (MSB), a 2-bit field is added for each additional dimension. Some embodiments employ up to 10 dimensions, which covers up to approximately 1 million nodes. While, in the embodiment of FIG. 1, 32 bits are assigned for the node address space, only 20 bits are occupied for node IDs for 10 dimensions. Thus, 12 bits are reserved for future use.

Each routing port (or simply "port") on each node may be individually addressed. In the routing port addressing scheme, the dimension information and the port identifier (ID) information are considered together. In the quad-node full mesh cluster, which is the basic building block for some embodiments, three bits in each node can represent three unique IDs that can be assigned to each port using a one-hot encoding scheme. The first dimension contains links connected to port IDs 0, 1, and 2; the second dimension contains links with connected to port IDs 3, 4, and 5, etc. This pattern continues for up to 10 dimensions in some embodiments. Each node is connected to three links extending to the other three nodes within a dimension. The three ports of each node serve as link connectors. The one-hot encoding technique may be employed to provide efficient link management (e.g., fault isolation or data isolation).

The routing port address space for each dimension consists of a 3-bit field, and a 3-bit field is added for each dimension, concatenated with the previous dimensions. The dimension information is embedded in the 3-bit field of the routing port address space (see FIG. 1). The first 3-bit field from the LSB side represents the lowest dimension (see dimension 1, D1, in the routing port address space of FIG. 1), and in the direction of the most significant bit (MSB), a 3-bit field is added for each additional dimension. Some embodiments include up to 10 dimensions, which covers up to an estimated 30 million ports. While, in the embodiment of FIG. 1, 32 bits are assigned for the routing port address space, 30 bits are occupied for port IDs for 10 dimensions. Thus, 2 bits are reserved for future usage.

FIG. 1 shows a high-level summary of an addressing scheme for an adaptive topology discovery protocol. The overall addressing scheme consists of a 32-byte address word, divided into four sub-address spans (each span containing 8 bytes or 64 bits). The topology-ID sub-address span internally consists of node address space (32 bits) and routing port space (32 bits). For a cluster architecture based on the quad-node full mesh basic building block, 2 bits may be used to represent the four nodes of each dimension.

"Dn" and "bb" for the node address space in the topology-ID sub-address span represent the dimension and node-IDs in a given dimension, respectively. As such, the node address may include the address of a node along the first dimension, and the address of a node along the second dimension, and so forth. For the case of the routing port space in the topology-ID sub-address span, "Dn" and "bbb" represent the dimension and port-IDs of a given dimension, respectively. One-hot encoding is used for the port-IDs. As mentioned above, the addressing scheme can cover up to 10 dimensions which involves 1 million nodes and 30 million ports.

The 32-byte address word also includes a QoS/CoS addressing scheme (which may also be referred to as a service level descriptor) with 64 bits of address space which can be used to classify memory pools according to service level characteristics, as cold, warm, and hot tiers. The temperature of a node may refer, for example, to the read latency or write latency of the memory media of the node, or to the throughput, or to a figure of merit that is based on read latency and write latency and throughput, with hot nodes generally being faster (e.g., having lower latency and higher throughput) than cold nodes. Within the word allocated for each tier, a reserved value (e.g., 0) may signify that the node is not in that tier. Within each tier, multiple sublevels are available. For example, the hot tier, to which 8 bits are allocated, includes 255 possible sub-levels (in addition to the reserved value), and, for example, 0 may mean that the node is not hot, 1 may mean that the node is barely hot (only slightly warmer than the warmest warm node) and 255 may mean that the node is very hot. The last sub-address span of the 32-byte address word carries the memory address for memory operations.

In some embodiments, each node stores the topology identifier and the service level descriptor for the node. This information may be written to non-volatile storage in the node when the cluster is assembled (e.g., when the physical connections between the nodes are put in place). When the host sends, to the node, a request (which may be relayed by other nodes) for the topology identifier or for the service level descriptor, the node may send a response (which may also be relayed by other nodes) with the topology identifier or with the service level descriptor, or it may disable one or more of the ports of the node (as discussed in further detail below).

Figure 2A:
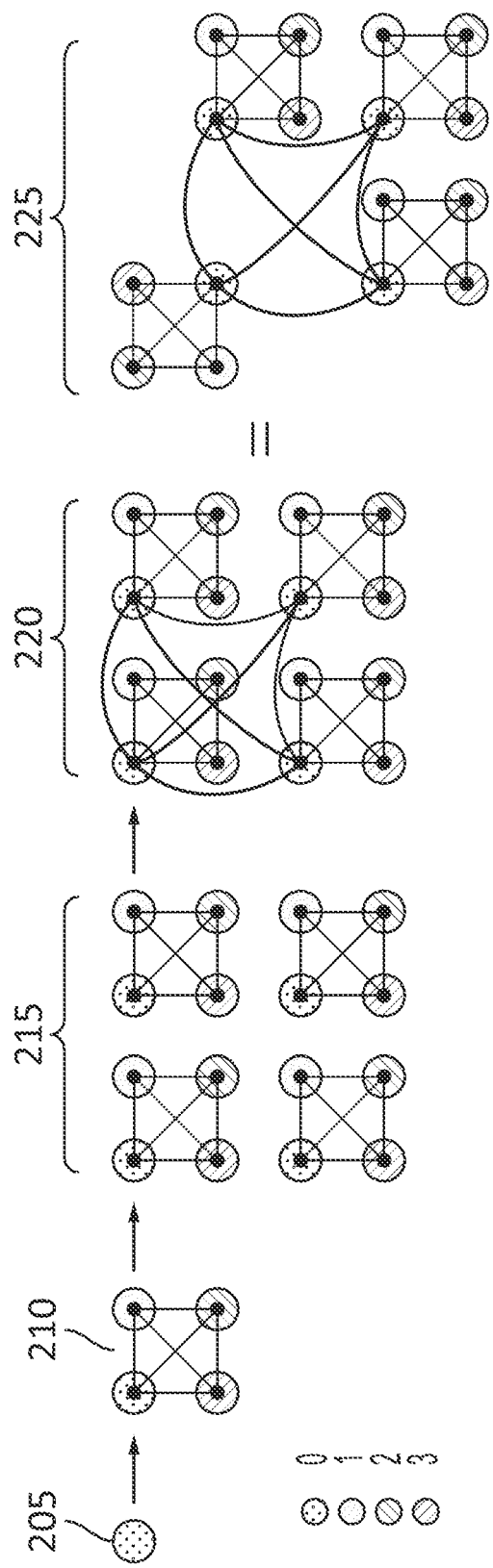
FIG. 2A is a memory cluster structure diagram, according to an embodiment of the present disclosure.
Figure 2B:
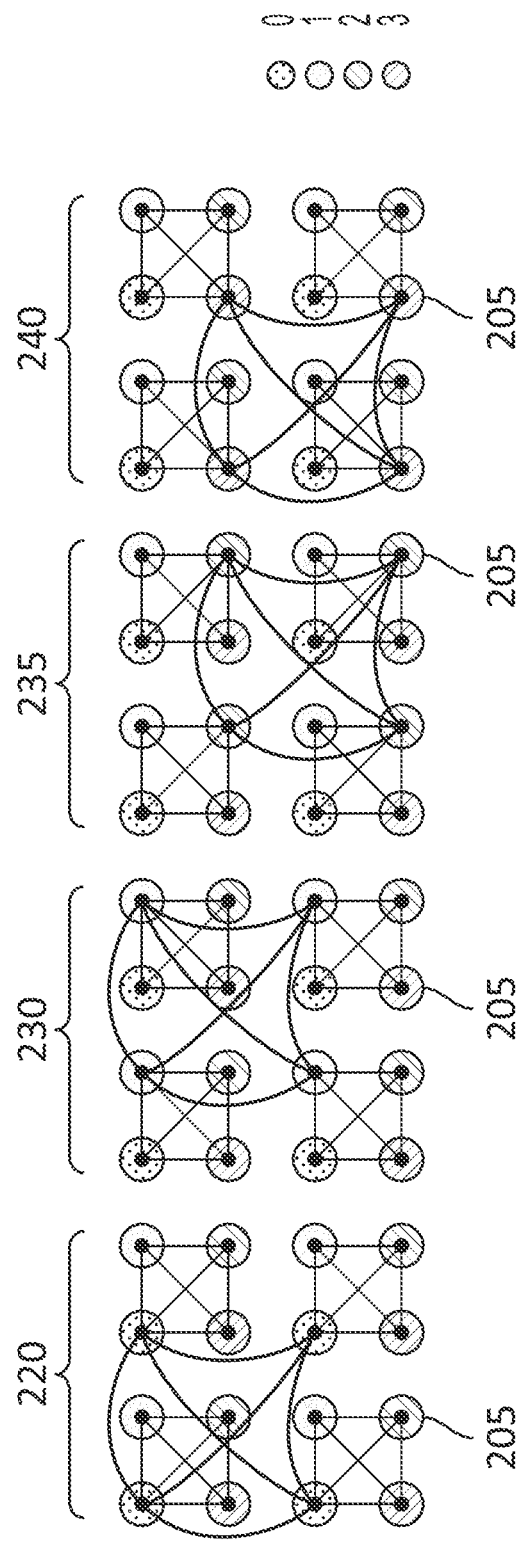
FIG. 2B is a memory cluster structure diagram, according to an embodiment of the present disclosure.
Figure 2C:
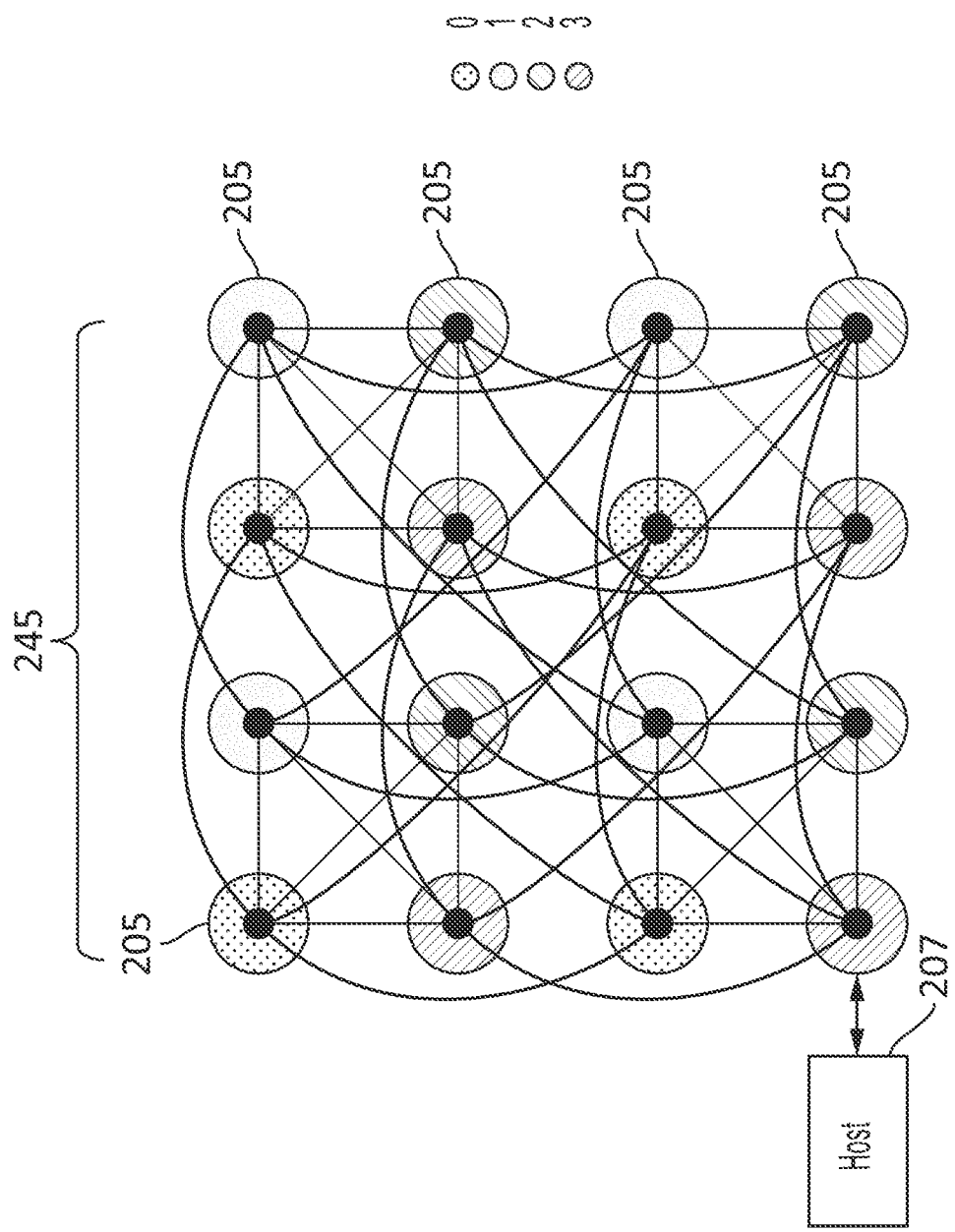
FIG. 2C is a memory cluster structure diagram, according to an embodiment of the present disclosure.

FIGS. 2A-2D show how the number of dimensions of the memory cluster may be increased from n to n+1 dimensions. FIG. 2A shows a series of clusters, showing how the size of a cluster may be increased by increasing the number of dimensions of the cluster. First, nodes 205 (each of which may be considered a zero-dimensional cluster) are interconnected by a full mesh, creating a cluster 210 (which may be referred to as a "basic building block cluster"), which is a one-dimensional cluster. The connections or "links" that connect the nodes 205 together may be memory-centric connections (discussed in further detail below). Then, a layer 215 is created by increasing the number of basic building blocks to the number of nodes in the initial block. The building block clusters 210 in the layer 215 are interconnected by the same node ID; e.g., all of the nodes with node ID 0 are connected together with a full mesh, forming the partially connected two-dimensional cluster 220. The partially connected two-dimensional cluster 225 is the same as the partially connected two-dimensional cluster 220, but it is drawn with one of the basic building block clusters 210 translated and rotated so that the full-mesh connections, along the second dimension, between the nodes with node ID 0 of the four basic building block clusters 210, are more readily discernible. At least one of the nodes may have (in addition to the routing ports for making connections to other nodes) an external port for making a connection to a host 207 (FIG. 2C).

FIG. 2B shows (i) the partially connected two-dimensional cluster 220, (ii) a partially connected two-dimensional cluster 230 in which nodes 205 with node ID 1 are connected together with a full mesh, (iii) a partially connected two-dimensional cluster 230 in which nodes 205 with node ID 2 are connected together with a full mesh, and (iv) a partially connected two-dimensional cluster 230 in which nodes 205 with node ID 3 are connected together with a full mesh. FIG. 2C shows a fully connected two-dimensional cluster 245, in which nodes 205 with node ID 0 are connected together with a full mesh, nodes 205 with node ID 1 are connected together with a full mesh, nodes 205 with node ID 2 are connected together with a full mesh, and nodes 205 with node ID 3 are connected together with a full mesh. In this example (which uses, as a basic building block cluster, a 4-node full mesh connection), every three links that extend from a node in a given dimension create a full mesh with other nodes along that dimension. As such, by adding three links to each node of a cluster having n dimensions, another layer and dimension can be created to scale up (or scale out) toward a larger cluster.

Figure 2D:
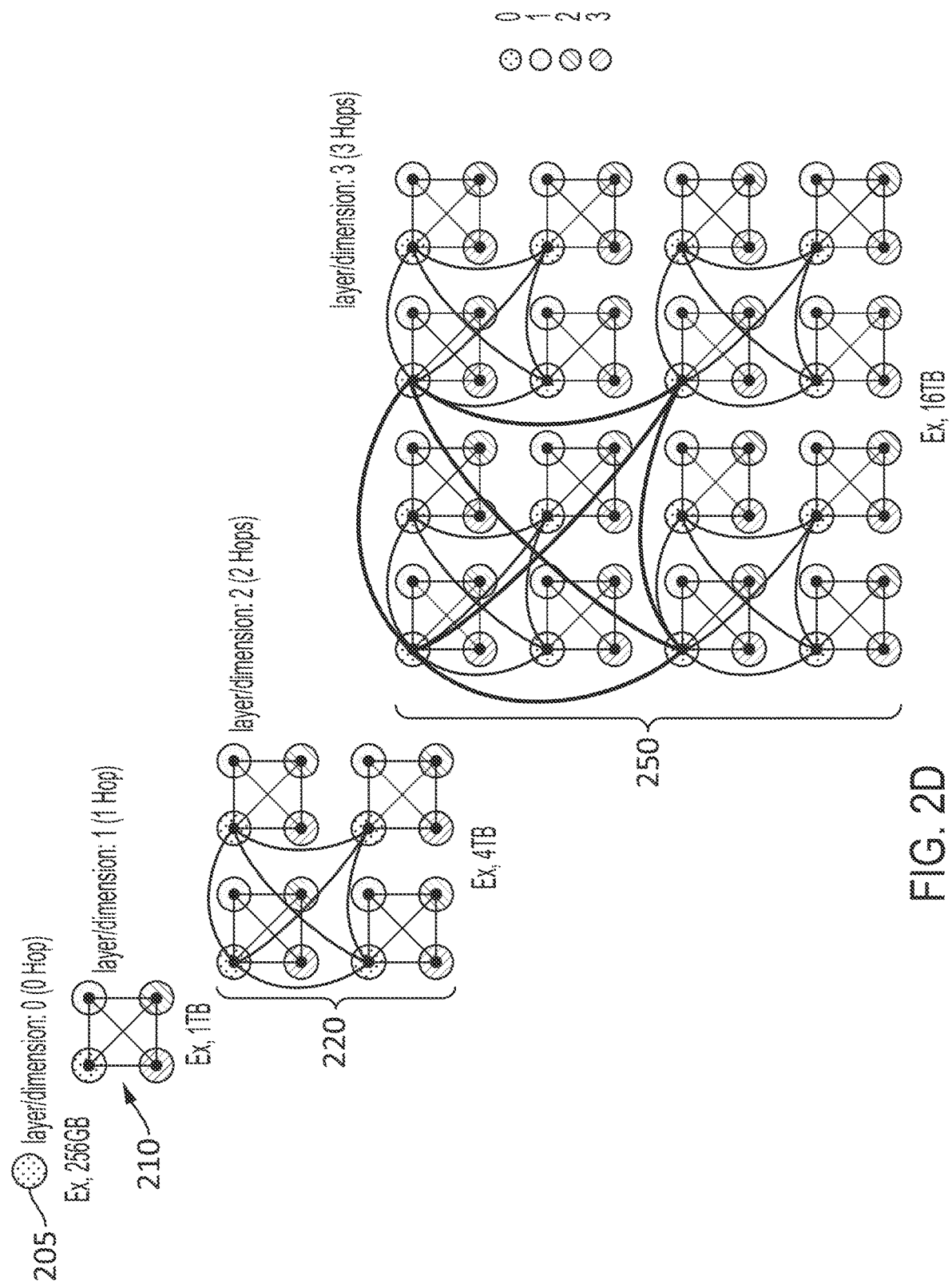
FIG. 2D is a memory cluster structure diagram, according to an embodiment of the present disclosure.

FIG. 2D shows another example of scaling to higher dimensions. FIG. 2D shows (i) a node 205 (a zero-dimensional cluster), (ii) a one-dimensional cluster 210 (iii) a partially connected two-dimensional cluster 220, and (iv) a partially connected three-dimensional cluster 250. The two-dimensional cluster 220 and the three-dimensional cluster 250 are shown in partially-connected form so that the connections are more easily discernable; in some embodiments each of these clusters has a full mesh of connections for each basic building block cluster 210, along each dimension. The process of increasing the number of dimensions, an example of which is shown in FIG. 2D, may in principle be repeated an arbitrary number of times, to produce an arbitrarily large cluster. Each time the number of dimensions is increased by one, the number of nodes in the new cluster is four times the number of nodes in the lower-dimensional cluster. For example, from one dimension to two dimensions, the number of nodes increases from 4 to 16, and from two dimensions to three dimensions, the number of nodes increases from 16 to 64. Additionally, in this example, the storage capacity of the cluster increases by a factor of 4 with each additional dimension. The multiplying factor depends on the number of nodes in the basic building block cluster; if, for example, the basic building block cluster includes three nodes instead of four, then with each additional dimension the number of nodes, and the total storage capacity, is increased by a factor of three.

The number of dimensions corresponds to the maximum hop count for communication from any node to any other node. This means that a one-dimensional cluster may possess a maximum hop count of one, a two-dimensional cluster may possess a maximum hop count of two, and a three-dimensional cluster may possess a maximum hop count of three.

In operation, the host 207 may (e.g., at startup) send a request to each of the nodes 205 for the service level descriptor of the node, and each node 205 may send a response, to the host 207, including the requested service level descriptor. If the node 205 to which the request is addressed is not directly connected to the host 207, then both the request and the response may be forwarded ((i) to the node 205 to which the request is addressed and (ii) back to the host 207, from the node 205 to which the request is addressed) by other nodes 205, including a node 205 that is directly connected to the host 207. The cluster may be densely populated, with most or all of the nodes supported by the addressing scheme being present. As such, the host may iterate through all of the supported addresses, in making requests at startup. If a node is absent or inoperative, then the request from the host may time out, or, if another node along the path to the addressed node is aware that the addressed node is absent or inoperative, the other node may send a response informing the host that the addressed node is absent or inoperative.

FIG. 3 is a table of cluster attributes, as a function of the number of dimensions. The table shows the number of dimensions, the number of nodes, the number of full mesh networks, the maximum hop count (the maximum number of hops for a communication from any node to any node in the N-dimensional cluster), the number of bits for the node address, and the number of links (or ports) per node. The table summarizes the attributes of a quad-node full mesh clustering architecture as dimensions increase. For example, for the case of five dimensions, the number of possible nodes is 1024. The 1024 nodes include (e.g., consist of) 256 quad-node full mesh networks, along any of the 5 dimensions. Among those 1024 nodes, communication between any two nodes can be done through a maximum of 5 hops.

Figure 4A:
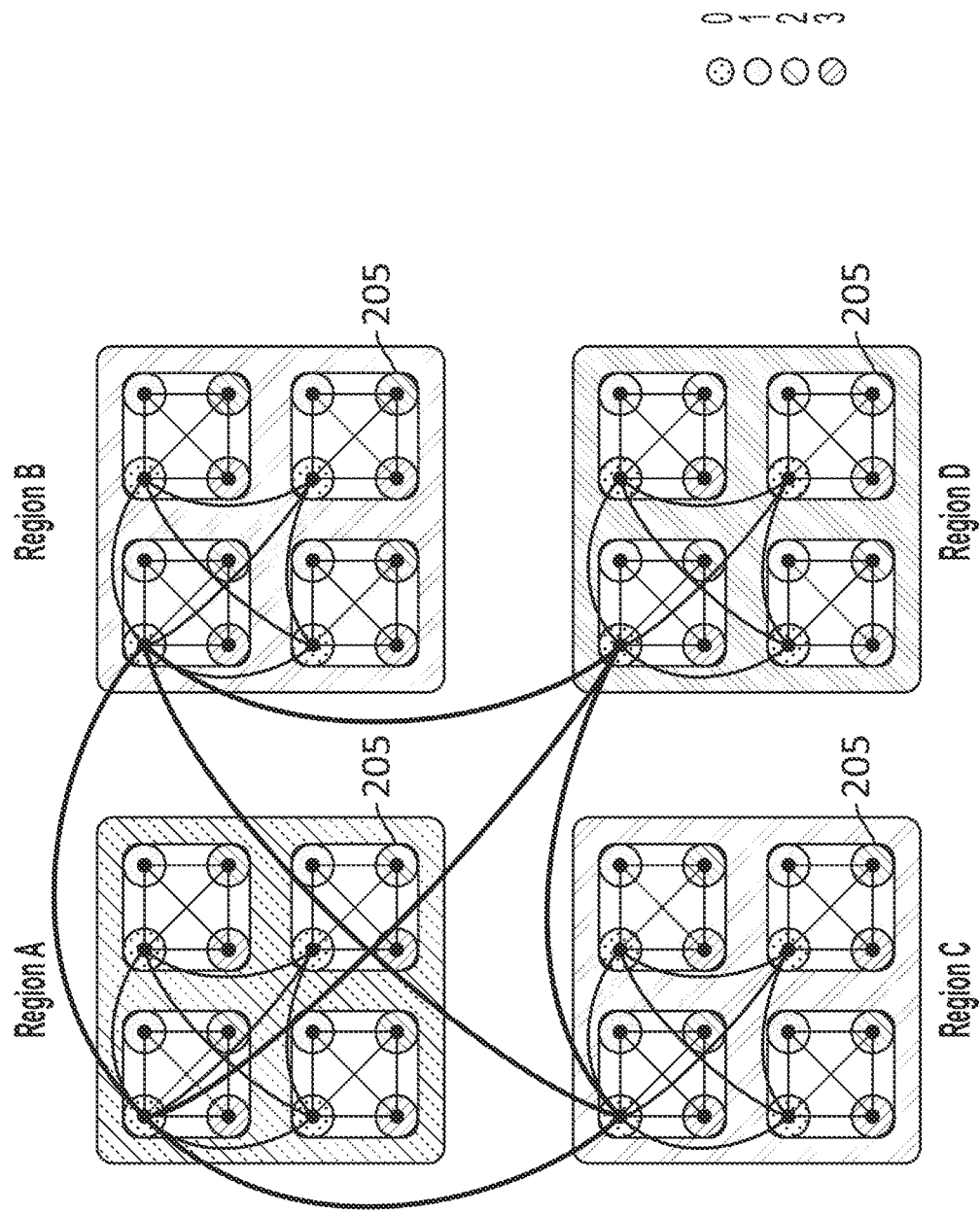
FIG. 4A is a schematic drawing of a memory cluster with segmentation for resource management, according to an embodiment of the present disclosure.

Some embodiments provide an efficient solution for managing large memory or storage resource pools through the adaptive topology discovery protocol. For example, FIG. 4A shows regional memory or storage segmentation for effective resource management. This may be accomplished, for example, using logical segmentation, in which regions are created in the memory or storage resource pool. The segmentation may be done through the adaptive topology discovery protocol. In this example, 64 nodes are segmented into 4 regions, identified in FIG. 4A as regions A, B, C, and D. Additionally, in each region, sub-regions may be created. In this case, there are 4 sub-regions within each region. FIG. 4A illustrates segmentation up to the 3rd layer or dimension. In some embodiments, logical segmentation is performed considering the link bandwidth per layer or dimension. For example, higher bandwidth or lower latency links may be used along a particular dimension (e.g., the bandwidth of a link along the second dimension may be at least twice as great as the bandwidth of a link along the first dimension), and a memory region including clusters connected along this dimension may be used to provide high throughput, low latency storage. For example, in a two-dimensional network in which connections along the second dimensions have higher bandwidth than connections along the first dimension, if a host is connected directly to a first node, and a second node, a third node, and a fourth node are connected to the first node along the second dimension, the region including the first, second, third and fourth node may be used by the host as a high throughput, low latency storage region.

Figure 4B:
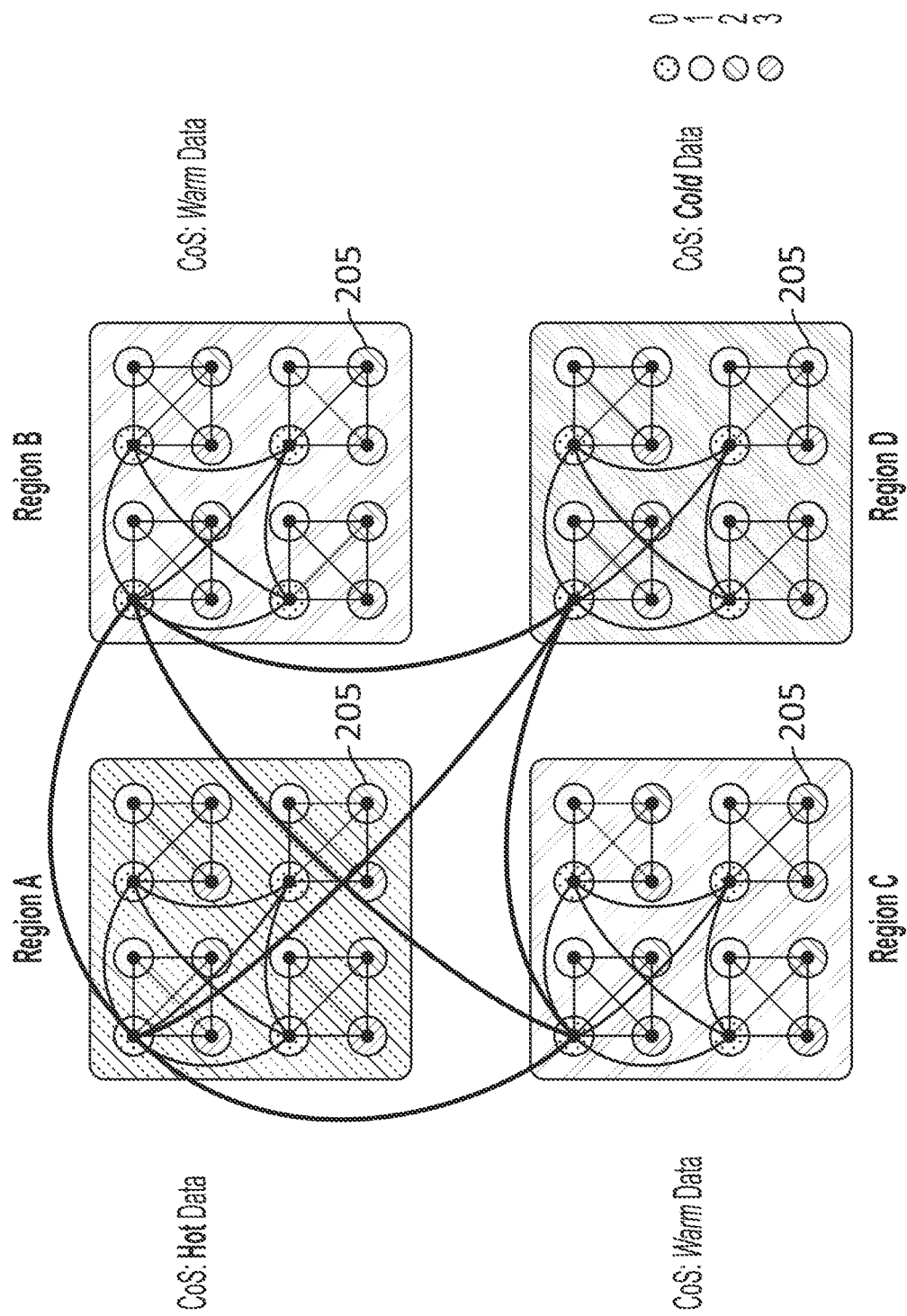
FIG. 4B is a schematic drawing of a memory cluster with segmentation by service level characteristic, according to an embodiment of the present disclosure.

FIG. 4B shows regional memory or storage segmentation for QoS/CoS. FIG. 4B shows an example of CoS assignments per region. With the adaptive topology discovery protocol, this segmentation can be completed, in which CoS assignments (e.g., to hot, warm, and cold tiers) may be made to each region through a layer or dimensional approach. In this case, three classes have been assigned to the four regions. For example, the hot, warm, and cold data classes may be assigned to (i) dynamic random access memory (DRAM), (ii) storage class memory/persistent memory (SCM/PM), or (iii) solid state drive (SSD) resource pools, respectively. QoS (e.g., memory type with load status—CXL type 3 memory expansion solution) can also be applied through the adaptive topology discovery protocol. In some embodiments, the classes (e.g., data type or memory type) are assigned based on the link bandwidth.

Figure 4C:
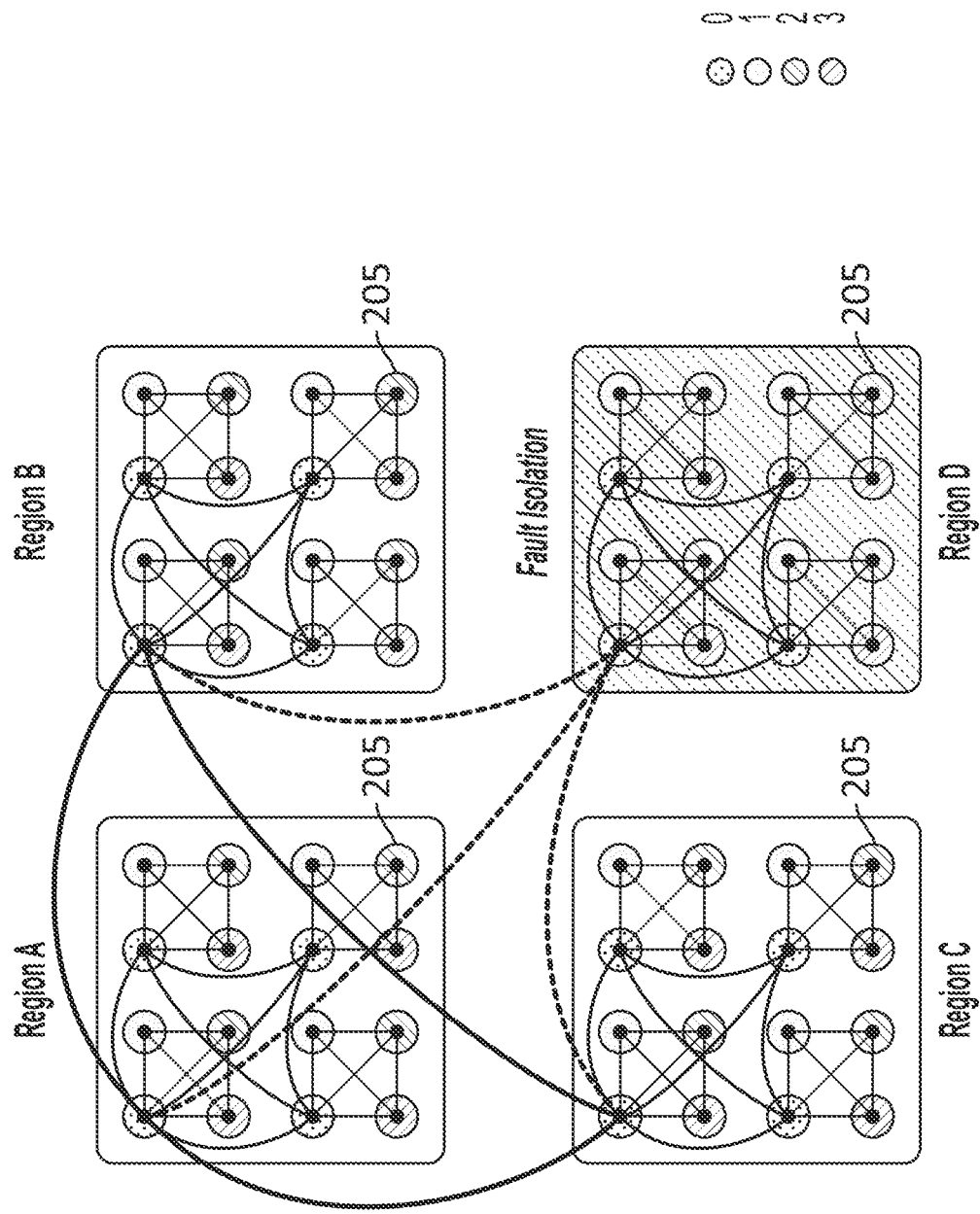
FIG. 4C is a schematic drawing of a memory cluster with segmentation for fault isolation, according to an embodiment of the present disclosure.

In some embodiments, regional memory or storage segmentation is used for fault isolation. FIG. 4C shows an example of fault isolation in the memory or storage resource pool. Fault isolation or data isolation may be done using one-hot encoding for Port-ID through the adaptive topology discovery protocol. Assuming that region D becomes a fault zone, the fault zone can be isolated by disabling the three links shown as dashed lines. This may be accomplished by sending, by the host (which may detect the fault in region D), to each node having a connection to region D, a disconnect command identifying each port through which the node is connected to region D. Each node receiving such a disconnect command may then disconnect from each node in region D. The nodes of the other regions need not be affected by the fault and may continue to provide service. In the example of FIG. 4C, this solution is being implemented in the third dimension. However, this fault isolation mechanism can effectively be applied in each layer or dimension of the cluster hierarchy.

Figure 5:
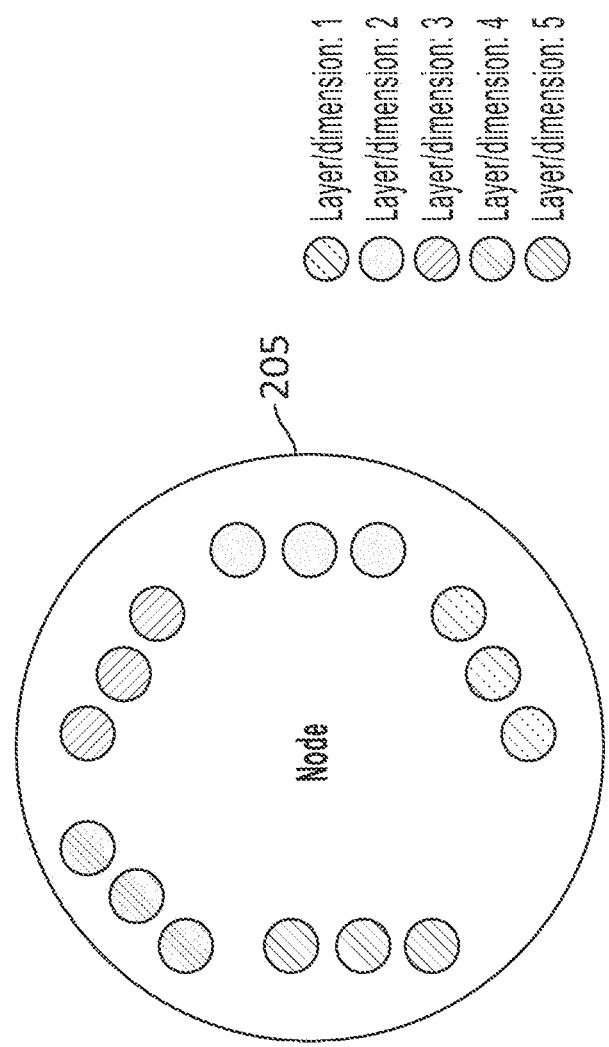
FIG. 5 is a schematic drawing of a node with 15 routing port groups, which covers up to $5^{th}$ dimension for 1K nodes, according to an embodiment of the present disclosure.

FIG. 5 shows the number of links in a node for a five-dimensional quad-node full mesh cluster. Each node has three links along each of the five dimensions (so as to be part of a full mesh network along each of the five dimensions), and FIG. 5 shows the total of 15 links needed. In the case of memory (or storage) nodes, these links can be utilized for large scale memory (or storage) pooling.

The table of FIG. 6 shows possible node locations for up to three dimensions. Depending on the node locations, the link medium (electrical or optical) may be applied differently. The dimension is embedded in a 2-bit field of the node address. One-hot encoding is used to identify the routing ports, and a 3-bit field is assigned to each node with one bit mapped to each port (as explained above in the context of FIG. 1).

Figure 7:
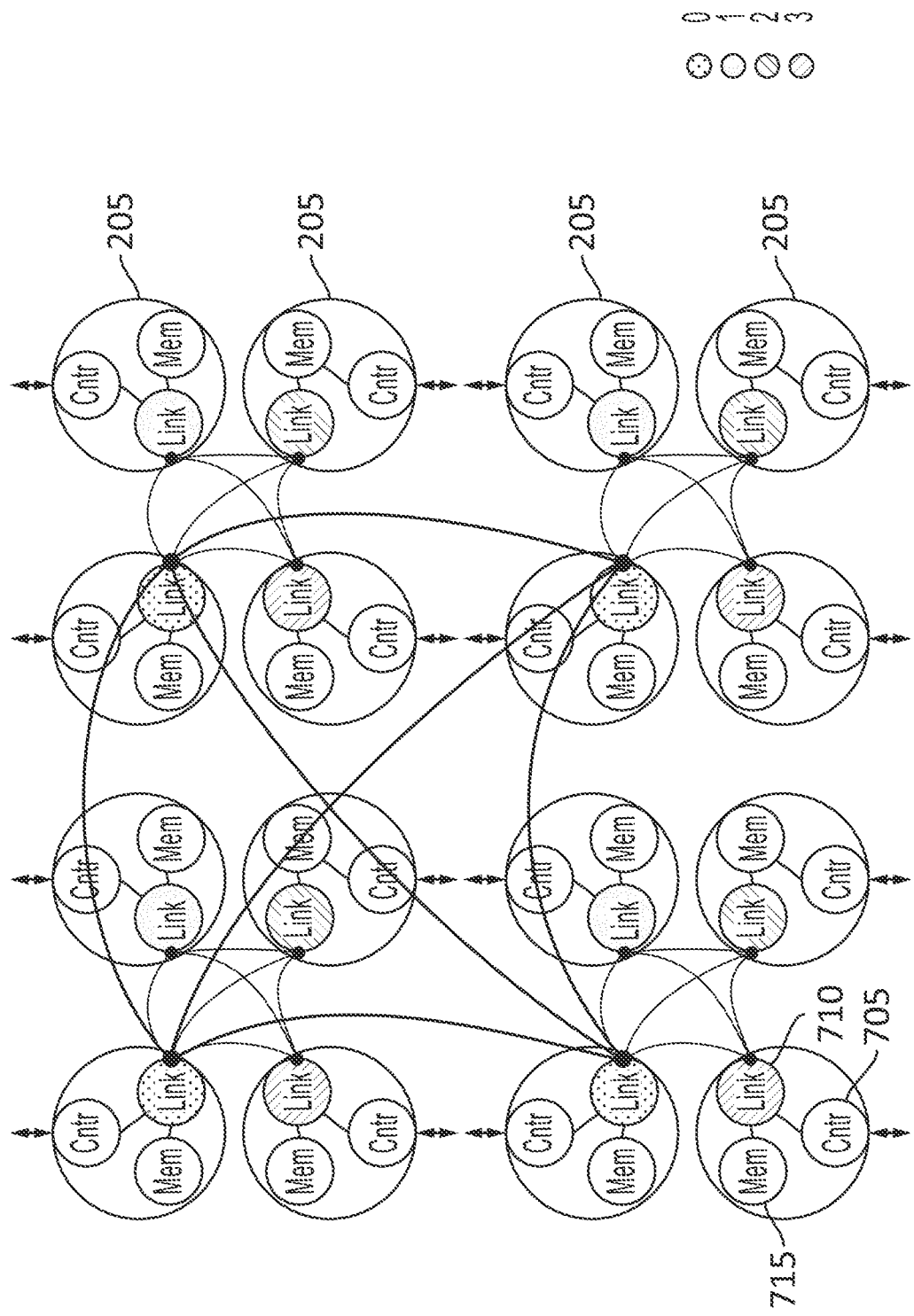
FIG. 7 is an illustration of a two-dimensional cluster, according to an embodiment of the present disclosure.

FIG. 7 shows memory pooling with the quad node full mesh hyper-torus clustering architecture. FIG. 7 illustrates scaling up with two layers or dimensions, to a cluster including 16 nodes 205, and requiring a maximum of two hops for communication between any two nodes 205. As such, the 16 nodes 205 could be one larger memory object or pool, and all sub-memory objects or pools may be capable of being synchronously accessed with a maximum 2-hop latency. In the embodiment of FIG. 7, each of the nodes 205 includes a controller 705 (which may be a processing circuit or a means for processing, (discussed in further detail below)), one or more ports 710 for connecting to other nodes 205, and memory 715.

The links drawn with a light line weight in FIG. 7 are links along the first dimension, and the links drawn with a heavier line weight are links along the second dimension. The link speed for each layer or dimension may be different per design or implementation and selection of link speed may be used as CoS features for memory. Various different approaches to link engineering may be employed. For example, the link medium may be electrical or optical (e.g., silicon photonic) based on bandwidth and latency requirements. Also, the link medium may be determined based on the link distance and latency (such an approach may also be used to implement QoS/CoS features). The nodes may be populated in various different ways—one node on a single board (e.g., with dimension 0), multiple nodes on a single sled (e.g., with dimension 1), multiple nodes on multiple sleds (e.g., with dimension 2 or 3) or multiple sleds in a pod (e.g., with dimension 3 and above), and the link medium (electrical/optical) may be chosen depending on the scale of the cluster.

A pluggable approach may be used for integrating the adaptive topology discovery protocol with other existing protocols. An adaptive topology discovery protocol according to embodiments described herein, e.g., for quad-node full mesh hyper-torus clustering architectures, may be applied to existing protocols for effective topological information discovery purposes. Also, existing protocols may take advantage of the features of some embodiments described herein. Existing protocols may adopt some embodiments through pluggable methods, resulting in a reduction in complexity, reduction in overhead cost, and capability for a modular approach (with increased flexibility and composability).

For example, the following existing protocols may be considered for adopting the present protocol in a pluggable way, and for providing scale up solutions. Some embodiments may use Peripheral Component Interconnect express (PCIe), by extension of the PCIe Physical Function (PF) and Virtual Function (VF). Some embodiments may use Compute Express Link (CXL), by extension of the input-output (CXL.io), PF(Physical Function) and VF(Virtual Function). Some embodiments may use Gen-Z links, or nonvolatile memory express over fabrics (NVMe-oF) links, or other types of links (e.g., NVLink™, Open Coherent Accelerator Processor Interface (OpenCAPI), or cache coherent interconnect for accelerators (CCIX). As used herein, a "memory-centric connection" is a connection suitable (e.g., having sufficiently low latency and sufficiently high throughput) for connecting a host to memory, such as PCIe, CXL, Gen-Z, NME-oF, NVLink™, or OpenCAPI.

Some embodiments described herein are constructed using a basic building block cluster that includes four nodes, but the present disclosure is not limited to this size of basic building block, and in general the number of nodes in a basic building block may be any positive integer k, greater than 1. The number of nodes in such a cluster may be $k^N$, and the total number of ports may be $N(k-1)k^N$.

Figure 8:
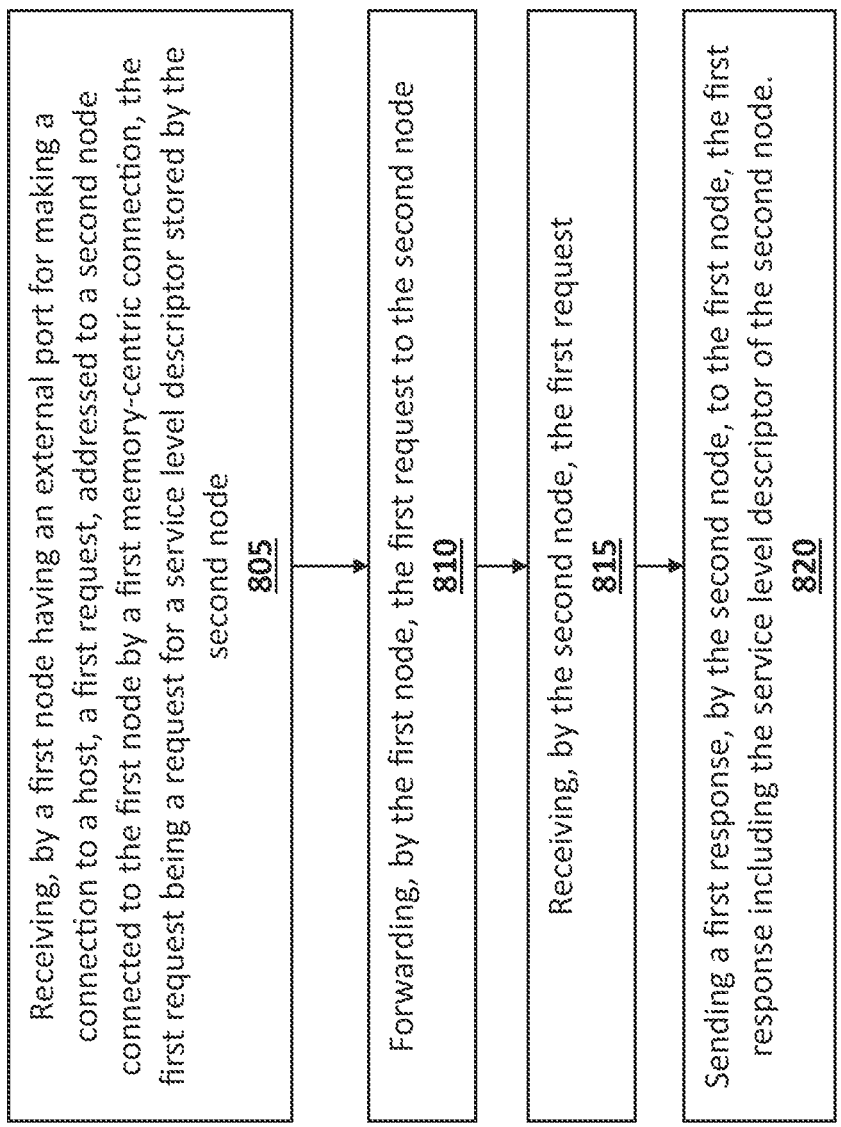
FIG. 8 is a flowchart of a method, according to an embodiment of the present disclosure.
Figure 9:
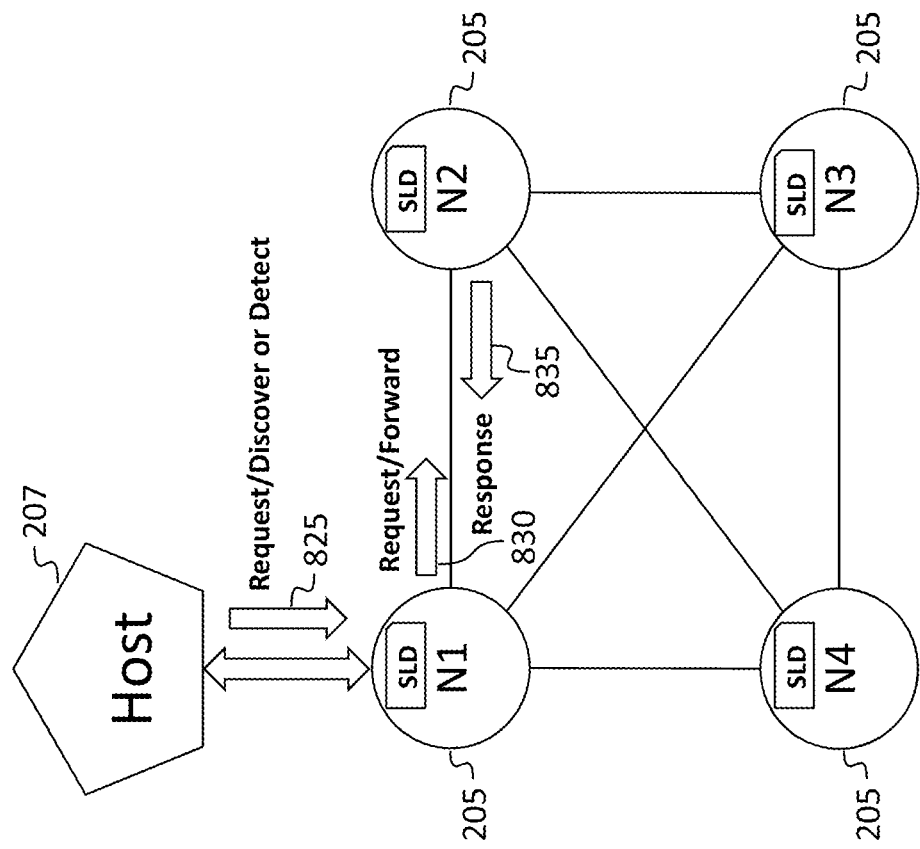
FIG. 9 is a hybrid block and flow diagram showing process steps overlaid on a block diagram including a host and a cluster of four nodes, according to an embodiment of the present disclosure.

FIG. 8 is a flowchart of a method according to some embodiments. The method includes receiving, at 805, by a first node having an external port for making a connection to a host, a first request, addressed to a second node connected to the first node by a first memory-centric connection, the first request being a request for a service level descriptor stored by the second node; forwarding, at 810, by the first node, the first request to the second node; receiving, at 815, by the second node, the first request; and sending, at 820, a first response, by the second node, to the first node, the first response including the service level descriptor of the second node. FIG. 9 shows a set of process steps overlaid on a block diagram including a host 207 and a cluster of four nodes 205. The set of process steps includes three main stages, including (i) a node discovery stage (which may proceed according to a PCIe/CXL enumeration process, or according to a similar or analogous process), (i) a detection stage, including detecting of the service level descriptors (SLDs) and form topology, and (iii) a connecting stage in which Set_Config( ), Get_Config( ), Add_Cap( ), or Remove_Cap( ) operations (or other such operations) may be employed to perform dynamic memory configuration. Each of these three stages may include the sending, by the host 207, of a request 825 (which may be a request to discover or detect an attribute of the cluster), forwarding of the request at 830, and responding to the request, at 835, by one of the nodes 205.

As used herein, a "service level descriptor" is a value that is a measure of the performance of a node, with respect, for example, to latency or throughput. As used herein, a "topology identifier" is a number that specifies the position (e.g., the coordinates) of a node within an N-dimensional network and that may include other information, e.g., a bit corresponding to each of the routing ports of the node.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

The terms "processing circuit" and "means for processing" are used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

It will be understood that when an element is referred to as being "directly connected" or "directly coupled" to another element, there are no intervening elements present.

As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Although exemplary embodiments of a multi-dimensional memory cluster have been specifically described and illustrated herein, many modifications and variations will be apparent to those skilled in the art. Accordingly, it is to be understood that a multi-dimensional memory cluster constructed according to principles of this disclosure may be embodied other than as specifically described herein. The invention is also defined in the following claims, and equivalents thereof.

What is claimed is:

1. A system, comprising:
    a first node, having an external port for making a connection to a host;
    a second node, connected to the first node by a first memory-centric connection;
    the second node storing a service level descriptor;
    the first node being configured to:
        receive, from the host, a first request, addressed to the second node, for the service level descriptor; and
        forward the first request to the second node,
    the second node being configured to:
        receive the first request; and
        send a first response to the host via the first node, the first response including the service level descriptor of the second node.

2. The system of claim 1, wherein the second node further stores a topology identifier comprising an address of the second node along a first dimension, and an address of the second node along a second dimension.

3. The system of claim 2, wherein:
    the topology identifier further comprises:
        a port identifier for a first port of the second node, and
        a port identifier for a second port of the second node,
    the first port of the second node is connected, by a second memory-centric connection, to a third node, the third node being separated from the second node along the first dimension; and
    the second port of the second node is connected, by a third memory-centric connection, to a fourth node, the fourth node being separated from the second node along the second dimension.

4. The system of claim 3, wherein the third memory-centric connection has a bandwidth at least twice as great as a bandwidth of the second memory-centric connection.

5. The system of claim 4, wherein the second node is configured, upon receipt of a disconnect command identifying the first port of the second node, to disconnect the second node from the third node.

6. The system of claim 5, further comprising a host, connected to the first node, wherein the host is configured:
    to detect a fault affecting the third node, and
    in response to detecting the fault, to send the disconnect command.

7. The system of claim 2, wherein:
    the first node is further configured to
        receive, from the host, a second request, addressed to the second node, for the topology identifier; and
        forward the second request to the second node,
    the second node is further configured to:
        receive the second request; and
        send a second response, to the first node, the second response including the topology identifier of the second node.

8. The system of claim 2, wherein the first node is connected, along the first dimension, to M other nodes, M being an integer greater than or equal to 4.

9. The system of claim 2, wherein the first node is connected, along the first dimension, to M other nodes, M being equal to 1 or 2.

10. The system of claim 1, wherein the host is configured to allocate memory from the first node or the second node to an application running on the host.

11. The system of claim 1, wherein:
    the first node is configured to receive the first request from the host via the external port; and
    the second node is configured to receive the first request from the first node via the first memory-centric connection.

12. The system of claim 11, wherein:
    the first memory-centric connection is a Compute Express Link (CXL) connection; and
    the external port comprises an electrical port or an optical port.

13. A method, comprising:
    receiving, by a first node having an external port for making a connection to a host, a first request, addressed to a second node connected to the first node by a first memory-centric connection, the first request being a request for a service level descriptor stored by the second node;
    forwarding, by the first node, the first request to the second node;
    receiving, by the second node, the first request; and
    sending a first response, by the second node, to the host via the first node, the first response including the service level descriptor of the second node.

14. The method of claim 13, wherein the second node further stores a topology identifier comprising an address of the second node along a first dimension, and an address of the second node along a second dimension.

15. The method of claim 14, wherein:
    the topology identifier further comprises:
        a port identifier for a first port of the second node, and
        a port identifier for a second port of the second node,
    the first port of the second node is connected, by a second memory-centric connection, to a third node, the third node being separated from the second node along the first dimension; and
    the second port of the second node is connected, by a third memory-centric connection, to a fourth node, the fourth node being separated from the second node along the second dimension.

16. The method of claim 15, wherein the third memory-centric connection has a bandwidth at least twice as great as a bandwidth of the second memory-centric connection.

17. The method of claim 16, further comprising:
    receiving, by the second node, a disconnect command identifying the first port of the second node; and
    disconnecting the second node from the third node.

18. The method of claim 17, further comprising:
    detecting, by a host connected to the first node, a fault affecting the third node; and
    in response to detecting the fault, sending, by the host, the disconnect command.

19. The method of claim 14, further comprising:
receiving, by the first node, from the host, a second request, addressed to the second node, for the topology identifier; and
forwarding, by the first node, the second request to the second node;
receiving, by the second node, the second request; and
sending, by the second node, a second response, to the first node, the second response including the topology identifier of the second node.

20. A system, comprising:
a first node, comprising a first means for processing, and having an external port for making a connection to a host;
a second node, connected to the first node by a first memory-centric connection, the second node comprising a second means for processing;
the second node storing a service level descriptor;
the first means for processing being configured to:
  receive, from the host, a first request, addressed to the second node, for the service level descriptor; and
  forward the first request to the second node,
the second means for processing being configured to:
  receive the first request; and
  send a first response to the host via the first node, the first response including the service level descriptor of the second node.

* * * * *